United States Patent [19]

Durchschlag

[11] Patent Number: 5,650,576
[45] Date of Patent: Jul. 22, 1997

[54] DEVICE FOR MEASURING SWITCHING FORCE

[75] Inventor: Gerald Durchschlag, Zeltweg, Austria

[73] Assignee: VAE Aktiengesellschaft, Vienna, Austria

[21] Appl. No.: 367,216

[22] PCT Filed: May 6, 1994

[86] PCT No.: PCT/AT94/00060

§ 371 Date: Feb. 27, 1995

§ 102(e) Date: Feb. 27, 1995

[87] PCT Pub. No.: WO94/27127

PCT Pub. Date: Nov. 24, 1994

[30] Foreign Application Priority Data

May 10, 1993 [AT] Austria ............................ 920/93

[51] Int. Cl.$^6$ .................................................. G01L 1/04
[52] U.S. Cl. ........................ 73/862.631; 73/761; 73/768
[58] Field of Search ............... 73/761, 768, 862.631, 73/862.632, 862.633, 862.635, 862.392

[56] References Cited

U.S. PATENT DOCUMENTS

| | | | |
|---|---|---|---|
| 2,600,029 | 6/1952 | Stone | 73/768 X |
| 2,873,341 | 2/1959 | Kutsay | 73/768 X |
| 3,695,096 | 10/1972 | Kutsay | 73/862.631 X |
| 3,799,108 | 3/1974 | Mosow | 73/761 X |
| 4,280,363 | 7/1981 | Johansson | 73/862.631 X |
| 4,319,766 | 3/1982 | Corteg et al. | 73/862.57 X |
| 4,412,456 | 11/1983 | Wilhelm et al. | 73/862.541 |
| 4,422,341 | 12/1983 | Espiritu Santo et al. | 73/862.57 X |
| 4,424,717 | 1/1984 | White | 73/862.333 |
| 4,478,091 | 10/1984 | Forrester | 73/862.541 |
| 4,510,814 | 4/1985 | Espiritu Santo et al. | 73/862.57 |
| 4,553,124 | 11/1985 | Malicki | 73/862.632 X |
| 4,721,001 | 1/1988 | Hesse et al. | 73/862.57 |
| 4,823,606 | 4/1989 | Malicki | 73/862.632 X |
| 5,131,276 | 7/1992 | Kibblewhite | 73/781 |
| 5,284,062 | 2/1994 | Ryffel | 73/768 |

FOREIGN PATENT DOCUMENTS

| | | | |
|---|---|---|---|
| 0199067 | 10/1986 | European Pat. Off. | 73/862.57 |
| 344496 | 12/1989 | European Pat. Off. | |

*Primary Examiner*—Elizabeth L. Dougherty
*Attorney, Agent, or Firm*—Cushman Darby & Cushman IP Group of Pillsbury Madison & Sutro, LLP

[57] ABSTRACT

The device that is used to measure the switching force in railway points incorporates a measuring bolt (5) that can be inserted into a joint in the point drive. At the unattached end of the measuring bolt there is a head (7) in which an electro-mechanical sensor (8) is arranged. The precise adjustment of the measuring bolt (5) within the joint is effected by using a spacer (10), which simplifies the removal of the measuring bolt once the measurements have been made.

8 Claims, 3 Drawing Sheets

DEVICE FOR MEASURING SWITCHING FORCE

BACKGROUND OF THE INVENTION

1. Field of the Invention

The present invention relates to a device for measuring switching force in railway points, this having a sensor and a measuring bolt that is in the form of a deformation body that is connected to the sensor and which can be inserted into a joint in the points drive.

2. Prior Art of the Invention

A device of the type described above, designated "BKM," has already been brought to market by FEHA as a switching force meter. The known switching force meter consists of a slotted steel body as a deformation body, and this accommodates a dial as an indicating instrument and an attachment device. The known switching force meter is used to measure the forces that occur between the points drive and the points, regardless of whether these forces act from the point drive onto the switch blades or as residual forces in spring point blades or as impact force against the retaining force or against the impact resistance of the points drive. To this end, the measurement bolt is inserted in a cardan joint or in a biaxial joint in place of a point connector bolt, and when this is done transverse bending beams are formed by the slots in the steel body. In the known device there are bead-like thickened portions on the outside and these serve in each instance as the point of application for the forces. A dial is provided as a measuring or indicating instrument on the bending beam that is extended upwards. A retaining device is provided to ensure the correct orientation of the measurement bolt in the particular joint, and this fits into the slot of the measuring bolt and is intended to prevent any axial displacement of the measurement bolt. Taken all in all, this results in a mechanical measuring device which, for a given level of precision, must display a high degree of mechanical sensitivity and for this reason must be particularly well protected during transportation and installation. The danger of damage to a mechanical switching force meter is naturally relatively high, and because of the retaining device that is selected, and which fits into the slot, some distortion of the forces that act on the bending beams can occur. Apart from mechanical measuring devices of this kind, a number of electro-mechanical force meters for bolts in joints are already known. For example, DE-A1 35 15 126 describes an electro-mechanical force meter in which at one end a rigid measuring rod and at the other bolt end a sensor are inserted into a cavity in a tubular bolt. Arrangements of this kind are vulnerable to vibration and entail the risk that all adjustments and calibration can be lost during installation and removal of the tubular bolt, so that replicable measurements during the demanding conditions of railway operation are not possible unless additional steps are taken. The same thing applies for the force meter that is described in DE-A1 34 34 843, in which, in the same way, a disk-shaped carrier is fixed in the interior of a cavity in a bolt, this carrier having strip-type strain gauges. During the installation and removal of a tube-shaped bolt of this kind there is a danger that the leads and conductors for the strain guages will be overstressed. Simple insertion and removal of a bolt of this kind without the use of costly tools is not possible without additional measures being taken.

SUMMARY OF THE INVENTION

In the force meter that is described in DE-A1 35 15 125, which is used to measure forces in a structural element that is in the form of a bolt, there is once again a tube-shaped bolt in which a measuring rod is inserted; the free end of this measuring rod fits into a coil. Such a configuration is relatively sensitive because of the great length of the measuring rod. When rolling stock moves across points, however, there is a great deal of vibration and although an arrangement of this kind will generate signals, these cannot be analyzed as a measured force unless additional steps are taken. Here too, it is impossible to achieve a simple and reliable measurement procedure in the presence of such vibration unless additional steps are taken. An analogously constructed force meter is also described in DE-A1 34 34 131.

It is the task of the present invention to create a device of the type described heretofore, which even during the demanding conditions of railroad operation, and particularly in the presence of vibration that occurs at the same time, generates clear signals from which a force that is to be measured can be identified, and which permits simple installation and removal in situ without risk of damage or maladjustment of the device when this is done. In order to solve this problem, the invention is essentially such that the sensor is formed as an electro-mechanical sensor and is arranged outside the point of application of the force on the measurement bolt, in a head that is connected to the measurement bolt. This means that no parts of the measuring sensor that could be exposed to oscillations because of the length of the measuring bolt are arranged within the measuring bolt itself; rather, electro-mechanical sensors are arranged outside the point of application of the force, in the head of the measuring bolt, and this results in a configuration that can have a correspondingly wide head, which simplifies insertion and removal of the bolt from the particular measurement position. A suitable, mechanically protected measurement sensor, as is described, for example, in U.S. Pat. No. 4,530,245, can be installed in a simple manner in the head of such a measuring bolt. Excessive forces, of the sort that would lead to a loss of adjustment of a measuring sensor in the case of conventional devices, can be avoided during the insertion or removal of the measuring bolt. The integration of all the structural elements that are required for measurement in a head that is connected to the measuring bolt permits the introduction of force in a manner similar to the mechanical switching force meter referred to in the introduction hereto, at a point outside the bending beams in the head, when the head that is connected to the measuring bolt can be configured in a sufficiently rugged manner. In order to ensure good deformability and thus a correspondingly strong signal, even in the case of a thick-walled configuration of the bolt head and in the case of an appropriately rugged stainless steel measuring bolt and head, it is advantageous that the configuration be such that the head is slotted transversely to the axis of the bolt so as to accommodate the measuring sensor.

In order to simplify the installation and removal of the point setting drive in parts, it is advantageous that the configuration be such that the head form a stop shoulder for a spacer, to accommodate the measuring sensor, the spacer incorporating points of application for a tool to remove the measuring bolt, and also encircling a part of the joint in which the measuring bolt is inserted. After the removal of a corresponding connecting pin from the cardan joint of a point drive, the measuring bolt can be slid into an appropriate position, in which connection a positioning lock for the measuring bolt, in particular for fixing into a rotated position is particularly advantageous for correct measurement, in order to avoid recalibration for each measurement. In order to fix the position of the measuring bolts correctly, the configuration is such that the stop shoulder of the head has an outline that is axially symmetrical and other than circular, and acts in conjunction with a recess or projections on the spacer in order to ensure correct rotational positioning, it being possible to secure the measuring bolt appropriately against rotation in this manner. This spacer is slid onto the fork piece before the bolt is installed, it being possible to match the spacer to the geometrical details of the fork piece of a joint. Because of the side cheeks of the rotational lock on the spacer, the measurement bolt is subsequently fixed in position in the joints, so that force is always applied to the measuring bolt in a precisely defined direction, and this is of particular advantage if the configuration is such that the measuring bolt is configured so as to be slotted in the axial direction, and that the axial slot extends as far as the first slot that runs transversely to the axis of the bolt. A measuring bolt that is slotted in this way permits greater deformation and for exactly replicable measurement of the force is always applied transversely to the longitudinal slots that are provided in the measurement bolt.

In a particularly advantageous manner, even in the case of a solid configuration of the measuring bolt with the measurement head, which is resistant to impact and slipping, the configuration can be such that the head incorporates two slots that are displaced in the axial direction, which thereby ensures appropriately sensitive measurement despite the solid and shock-resistant configuration.

As has already been discussed, the spacer serves to accommodate a tool that is used to withdraw the measuring bolt and because of the fact that this spacer fits around the part of the joint in which the measurement bolt is inserted, this ensures a specific position of the spacer and thus a defined rotated position of the measurement bolt.

A shock-resistant and simple configuration of the measuring bolt of this kind can advantageously be used in demanding railway operations directly by connecting it to a PC or laptop thereby forming a complex analytical device, in which connection it is advantageous that the configuration be such that the sensor be connected through a signal amplifier and an analog/digital converter to a standard interface, in particular to a serial interface, and to a computer having a memory and a display device.

Taken all in all, this results in simple and precise fixing of the measuring bolt with appropriately simple release of the measuring bolt and great measurement precision, in which connection it is possible to use a component that possesses a high level of shock resistance and resistance to wear.

BRIEF DESCRIPTION OF THE DRAWINGS

The present invention will be described in greater detail below on the basis of an embodiment shown diagrammatically in the drawings appended hereto. These drawings show the following.

DETAILED DESCRIPTION OF THE INVENTION

Figure 1:
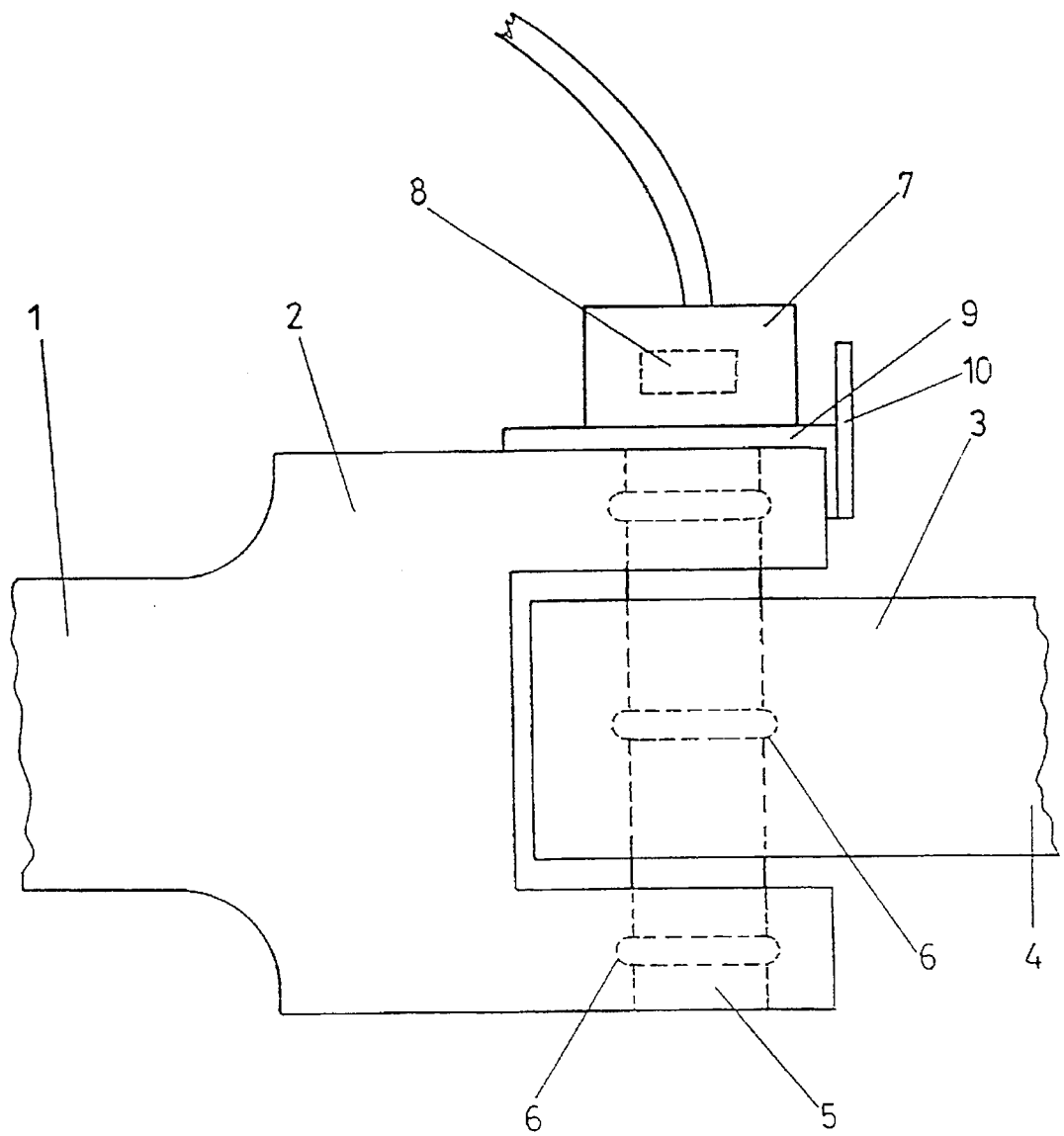
FIG. 1: a diagrammatic partial view through a joint with a measuring bolt installed.

FIG. 1 shows the end of a connecting rod 1 that has a forked piece 2 that accommodates the bearing eye of a coupling rod 4. The connection between the bearing eye 3 and the fork piece 2 is effected by means of a measuring bolt 5 which has, on its periphery, rib-like raised portions 6, which are indicated diagrammatically, and which each fit closely in the appropriate recesses in the fork piece 2 or of the bearing eye 3. At the unattached end of the measuring pin 5 there is a head 7 in which an electro-magnetic sensor 8 is arranged. The head 7 has on its end that is proximate to the outside of the fork 2 a stop shoulder for a plate-like cross piece 9 of a spacer 10 and is appropriately secured to the spacer 10 to ensure that it is fixed with respect to rotation. The spacer 10 encloses the claw or fork piece 2, respectively, with parts that run transversely to the plate-shaped cross piece 9.

Figure 2:
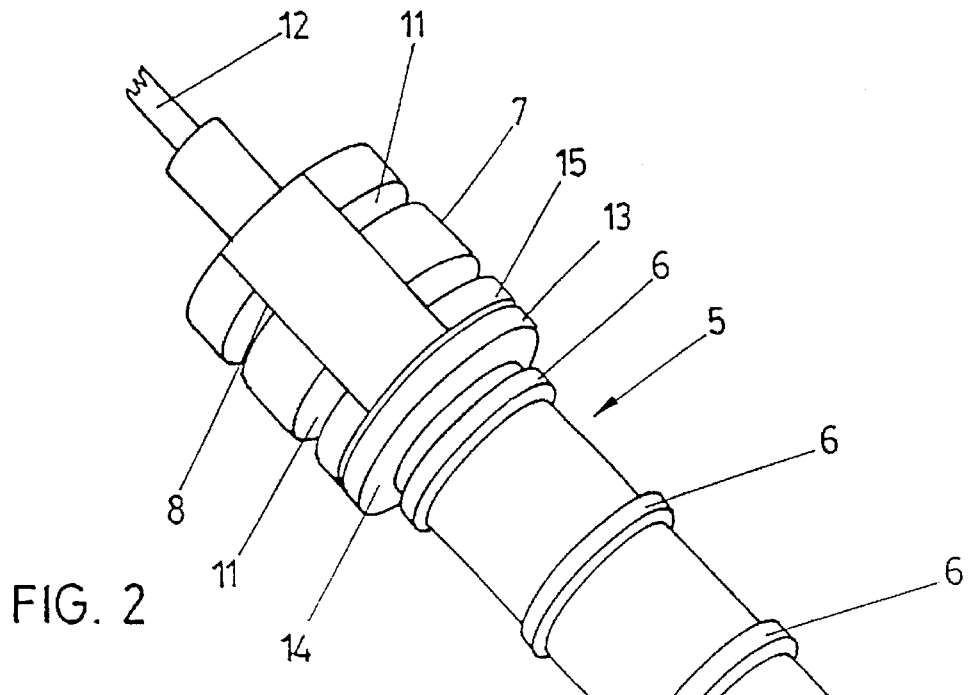
FIG. 2: a perspective side view of the measuring bolt according to the present invention.

FIG. 2 shows the measuring bolt 5 in detail. On the outside of the measuring bolt that fits into the bearing eye and passes through the fork piece 2, there are, once again, annular raised portions 6 that serve to introduce force. The widened head 7 is formed with slots 11 and contains the electro-mechanical measuring sensor 8 in its cavity. The electrical line, appropriately protected against tension, is numbered 12.

Figure 3:
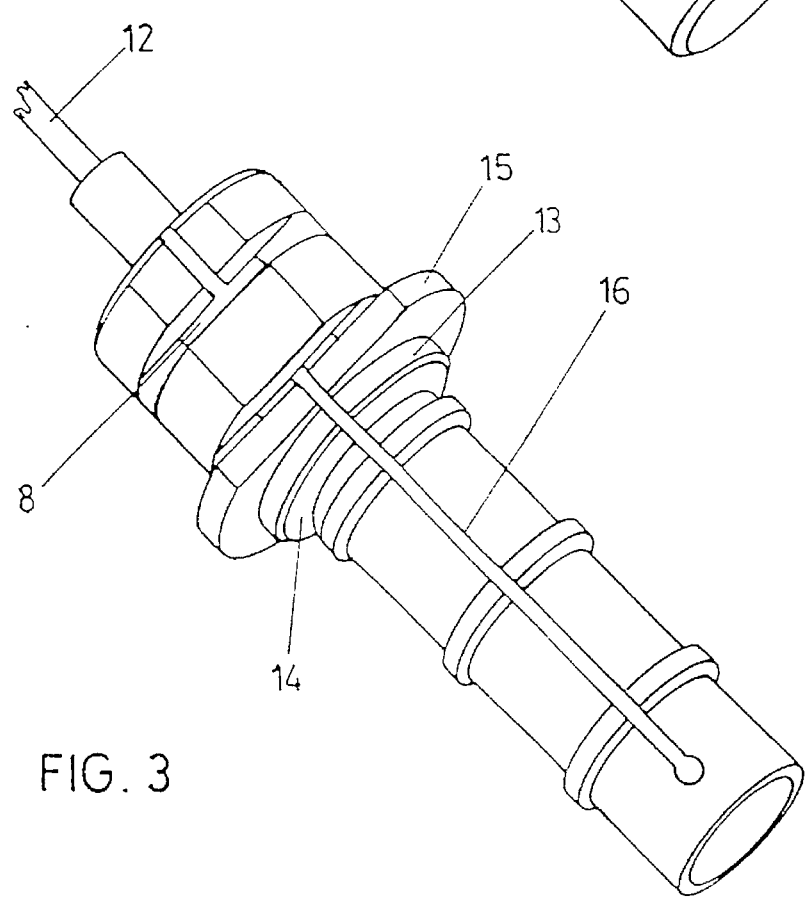
FIG. 3: an additional perspective view of the measuring bolt according to the present invention.

It can be seen from the drawing at FIG. 3 that the lower plate-shaped element 13 that is proximate to the measuring bolt 5, and which incorporates the stop shoulder 14 for the cross piece 9 of the spacer is overlapped in the direction towards the head by an annular flange 15 with the outline that is other than circular, as can be seen by comparing FIG. 2 and FIG. 3. The outline of the annular flange, which is other than circular, serves to secure the spacer 10, as indicated in FIG. 1, against rotation.

The measuring bolt itself incorporates a slot 16 that extends in the axial direction which thereby forms bending beams, the deformation of which is passed on to the electro-mechanical sensor that is arranged in the head.

Figure 4:
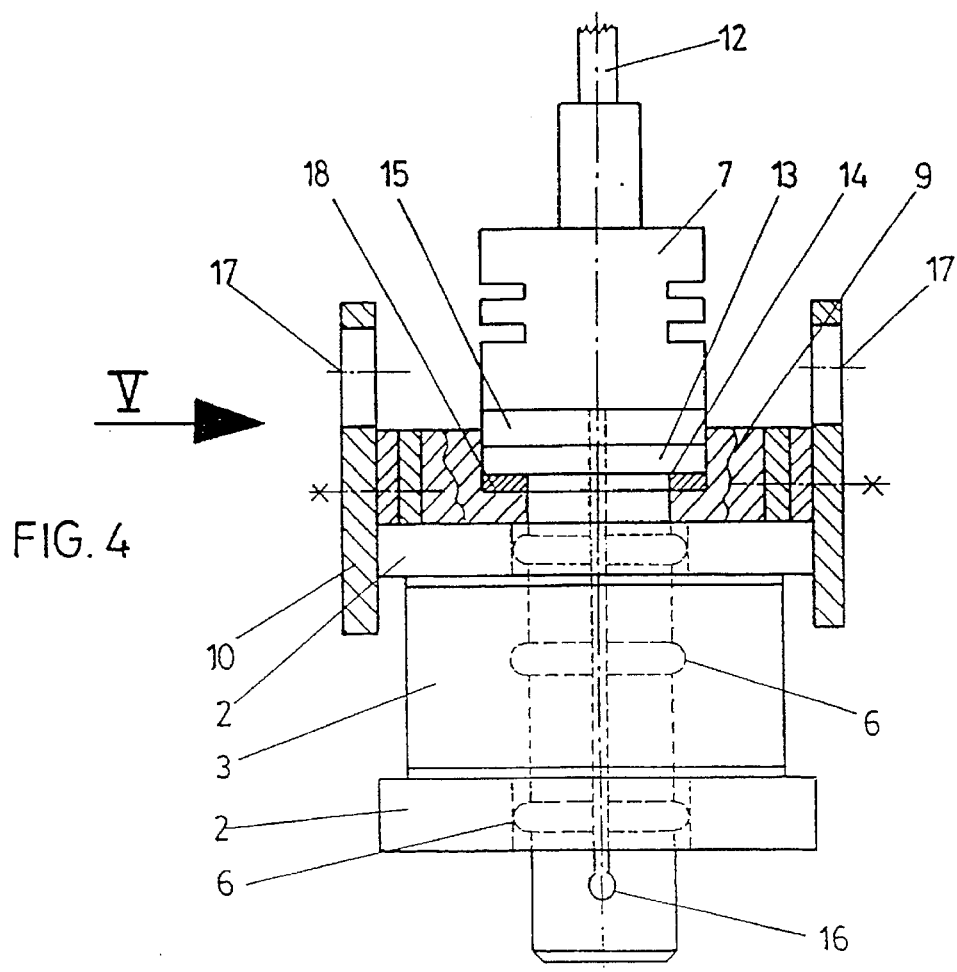
FIG. 4: a diagrammatic drawing of the measuring bolt that is inserted into the joint using a spacer.

FIG. 4 is a diagrammatic representation of the measuring device in greater detail. Once again, the spacer that encloses the fork piece 2 is numbered 10. The spacer incorporates attachment points 17 for attaching a tool that is used to withdraw the measuring bolt. Once the spacer 10 has been installed on the fork piece 2 and the bearing eye 3 has been positioned, the measuring bolt 5 is moved into the desired position, in which connection the slot of the measuring bolt 5 is numbered 16. The rotated position is secured in that the flattened area of the flange 15 fits into the recess in the plate-shaped cross piece 9. Flexible washers are fitted between the stop shoulder 14 and the corresponding contact surface on the plate-shaped piece 9, and this prevents longitudinal forces on the measuring bolt and provides for more precise measured values. The exact positioning of the height of the measuring bolt is effected, optionally, by interposing the shims or spacing washers between the measuring head 7 and the plate-shaped cross piece 9 of the spacer or by using inserts between the spacer and the fork piece. The plate-shaped cross piece 9 is fixed in position relative to the fork piece 10 by lateral distance pieces 19 and screws 20 that connect the plate-shaped cross piece 9 to the transverse walls of the spacer 10.

Figure 5:
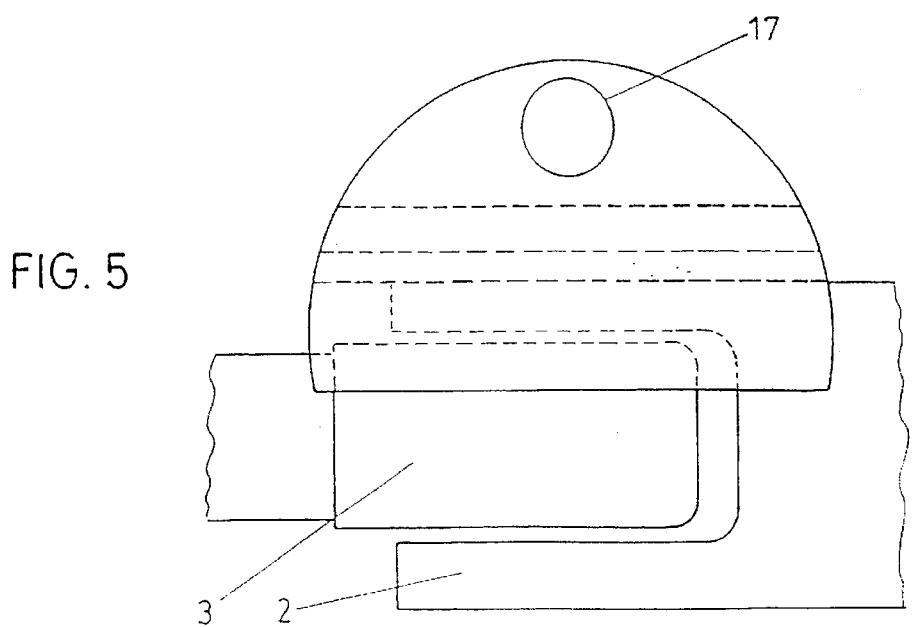
FIG. 5: a view in the direction indicated by the arrow V in FIG. 4.

FIG. 5 shows the recesses 17 for fitting the tool used to withdraw the measuring bolt. Because of the fact that the spacer 10 is used to withdraw the measuring bolt, it is possible to prevent excessive forces from acting on the head or the measuring bolt.

I claim:

1. A device for measuring point-setting force in railway points, comprising:

a measuring bolt which includes: a deformable body portion inserted within a joint in the railway points to which joint said force is applied; and an electro-mechanical sensor positioned outside the joint within a head portion of said bolt, the head portion being integrally formed with the body portion as a single piece whereby the sensor is directly responsive to deformation of the body portion by force applied to said body portion in a direction transverse to a longitudinal axis of said bolt, and the head portion including a stop shoulder for positioning a spacer, said spacer enclosing a part of said joint and including attachment points used for withdrawing the body portion of the bolt from the joint.

2. A device as claimed in claim 1, wherein said stop shoulder is configured to interact with the spacer to prevent the spacer from rotation about the longitudinal axis of said bolt.

3. A device for measuring point-setting force in railway points, comprising:

a measuring bolt which includes: a deformable body portion inserted within a joint in the railway points to which joint said force is applied; and an electro-mechanical sensor positioned outside the joint within a head portion of said bolt which includes a slot extending transversely to a longitudinal axis of the bolt, the sensor being responsive to deformation of the body portion by force applied to said body portion in a direction transverse to said longitudinal axis.

4. A device as claimed in claim 3, wherein said bolt includes an axial slot provided in the body portion extending in the direction of said longitudinal axis to said slot in the head portion.

5. A device as claimed in claim 3 or claim 4, further comprising a second slot in said head portion extending transversely of the axis of the bolt and in spaced relationship from the first slot in the head portion.

6. A device as claimed in claim 3, wherein said head portion includes a stop shoulder for positioning a spacer, said spacer enclosing a part of said joint and including attachment points used for withdrawing the body portion of the bolt from the joint.

7. A device as claimed in claim 6, wherein said stop shoulder is configured to interact with the spacer to prevent the spacer from rotation about the longitudinal axis of said bolt.

8. A device as claimed in claim 3, wherein the sensor is connected through a signal amplifier and an analog/digital converter to a computer having a memory and a display unit.

* * * * *